United States Patent [19]
Saint-Pierre et al.

[11] Patent Number: 6,081,438
[45] Date of Patent: Jun. 27, 2000

[54] PARALLEL-LOADED SERIES RESONANT CONVERTER HAVING A PIEZO-ELECTRIC CRYSTAL AS SELF-OSCILLATING ELEMENT

[75] Inventors: Roland Sylvere Saint-Pierre, Lawrenceville; Ashok R. Patil, Duluth, both of Ga.

[73] Assignee: Motorola, Inc., Schaumburg, Ill.

[21] Appl. No.: 09/224,416

[22] Filed: Dec. 31, 1998

[51] Int. Cl.[7] .............................. H02M 7/44; H02K 1/32
[52] U.S. Cl. ................. 363/95; 363/131; 310/64
[58] Field of Search ................. 363/95, 16, 17, 363/97, 49, 56, 131; 310/316.01, 64

[56] References Cited

U.S. PATENT DOCUMENTS 4,179,671  12/1979  Yoshida et al. .................. 331/116 E
5,864,472  1/1999  Peterson .......................... 363/18

*Primary Examiner*—Adolf Deneke Berhane
*Assistant Examiner*—Rajnikant B. Patel
*Attorney, Agent, or Firm*—Felipe Farley; Philip Burrus

[57] ABSTRACT

A series-resonant power converter (10) comprising a transformer (100), a resonant tank circuit (120) having a piezo-electric crystal (122) as the resonant element and a series-connected resonant capacitor (124). First and second switches (132 and 134) are connected to the transformer (100) and are driven by voltages at windings of the transformer so as to alternately turn on. The piezo-electric crystal (122) self-oscillates to store and release energy and thereby charge and discharge the capacitor (124). Moreover, as a result of the self-oscillation of the resonant circuit (120), the switches (132 and 134) are alternately driven in synchronism with the charging and discharging cycle of the capacitor (122) through windings of the transformer (100). No additional switching circuitry is needed to achieve proper oscillation of the resonant tank circuit (120).

11 Claims, 8 Drawing Sheets

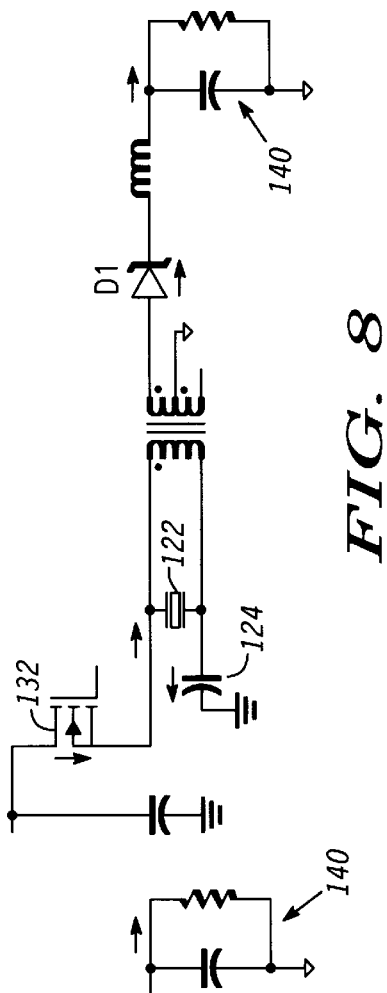
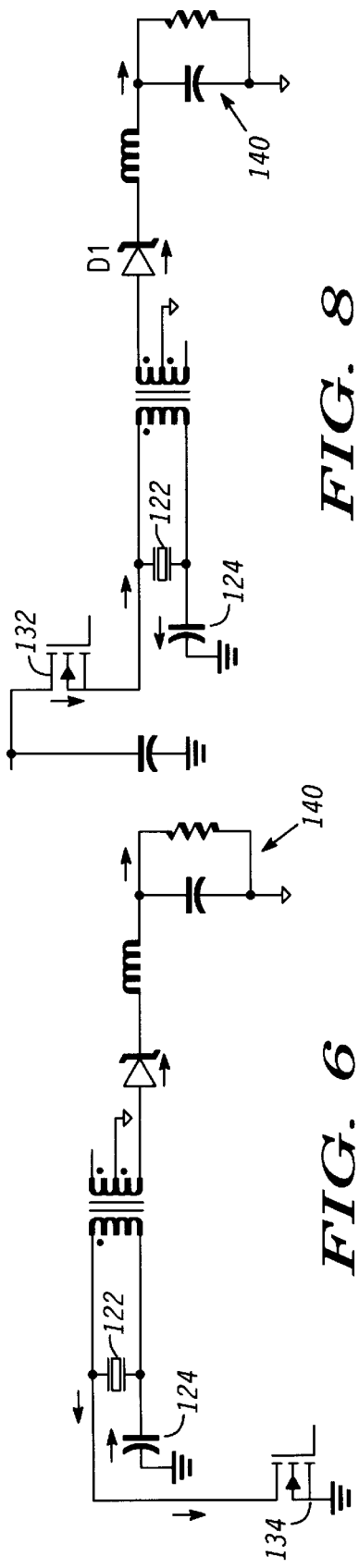
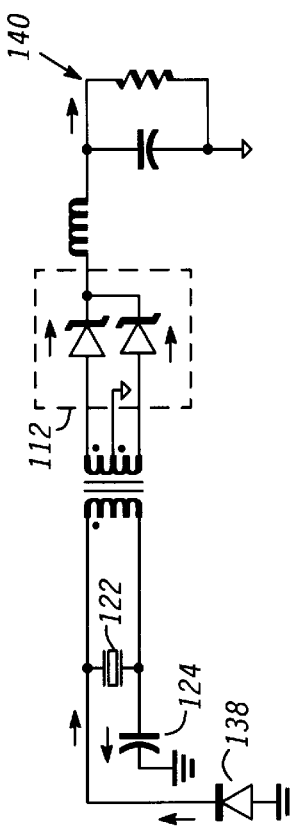
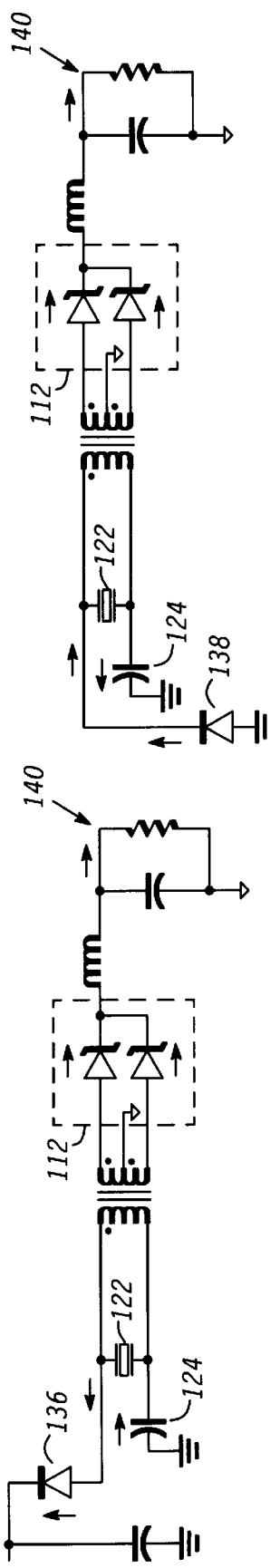

PARALLEL-LOADED SERIES RESONANT CONVERTER HAVING A PIEZO-ELECTRIC CRYSTAL AS SELF-OSCILLATING ELEMENT

RELATED APPLICATION

This application is related to commonly assigned U.S. application Ser. No. 09/244,407, filed on even date, Docket No. EN 10765, and entitled "Circuit And Method For Reactive Energy Recirculation Control Of Series Resonant Converter," the entirety of which is incorporated herein by reference.

FIELD OF THE INVENTION

The present invention is directed to power supply devices for portable electronic devices, such as laptop and desktop computers, and more specifically to a series-resonant converter having a piezo-electric crystal as a self-oscillating element.

BACKGROUND OF THE INVENTION

Power converters are used to convert alternating current (AC) power to suitable direct current (DC) levels for powering an apparatus, such as laptop computers and other appliances. In portable electronic devices of this sort, it is desirable to maximize power output per topology space.

A power converter requires a resonant element that stores energy so as to set up the oscillations necessary for power conversions. It is very common to employ an inductor as the resonant element to store magnetic energy. Inductors tend to be quite large circuit components and thus place restrictions on the ability of the circuit designer to minimize the overall size of the converter. In addition, inductors are quite "lossy" and therefore have a relative low "Q" value that detracts from the performance of the converter.

In addition, self-oscillating power converters are well known in the art. The most popular are those based on the Royer and Jensen self-oscillating push-pull technology. An inherent disadvantage of these prior art self-oscillating power converters is that they have poor short-circuit and open-circuit load characteristics. In addition, these power converters require special protection and control circuitry.

There is a need for a power converter that optimizes the amount of power that is generated per unit area of the topology, and which uses a resonant element that is more compact and has a higher "Q" than a standard inductor, thus making it more suitable for portable electronic power applications.

BRIEF DESCRIPTION OF THE DRAWINGS

FIGS. 6–9 are partial schematic diagrams showing the flow of current at four stages of the switching cycle of the series-resonant converter according to the present invention.

DETAILED DESCRIPTION OF A PREFERRED EMBODIMENT

Figure 1:
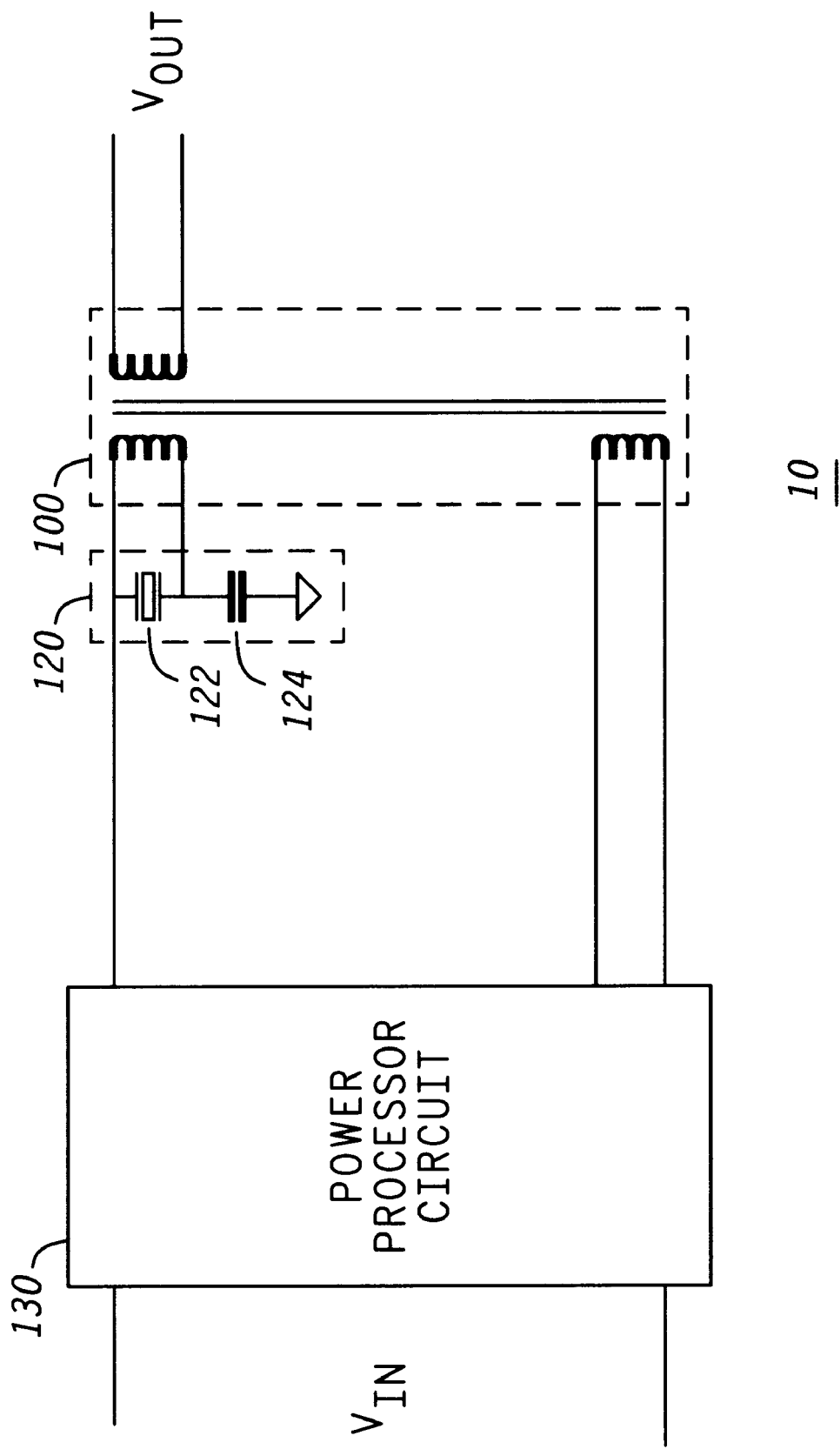
FIG. 1 is a general block diagram of a series-resonant converter according to the present invention.

Referring first to FIG. 1, the parallel-loaded series-resonant converter according to the present invention is generally shown at reference numeral 10. The basic components of the series-resonant converter 10 are a high frequency transformer 100, a resonant tank circuit 120, and a power processor circuit 130. Important to the present invention is that the resonant tank circuit 120 comprises a piezo-electric crystal 122 and a resonant capacitor 124. The power processor circuit 130 controls switching of the current through the resonant tank circuit 120 and is driven by a primary winding of the transformer 100, which in turn is driven by the resonant tank circuit 120 through a different primary winding. The series-resonant converter 10 converts an input voltage $V_{IN}$ to an output voltage $V_{OUT}$ of a suitable voltage level and stability so as to drive a load.

Figure 2:
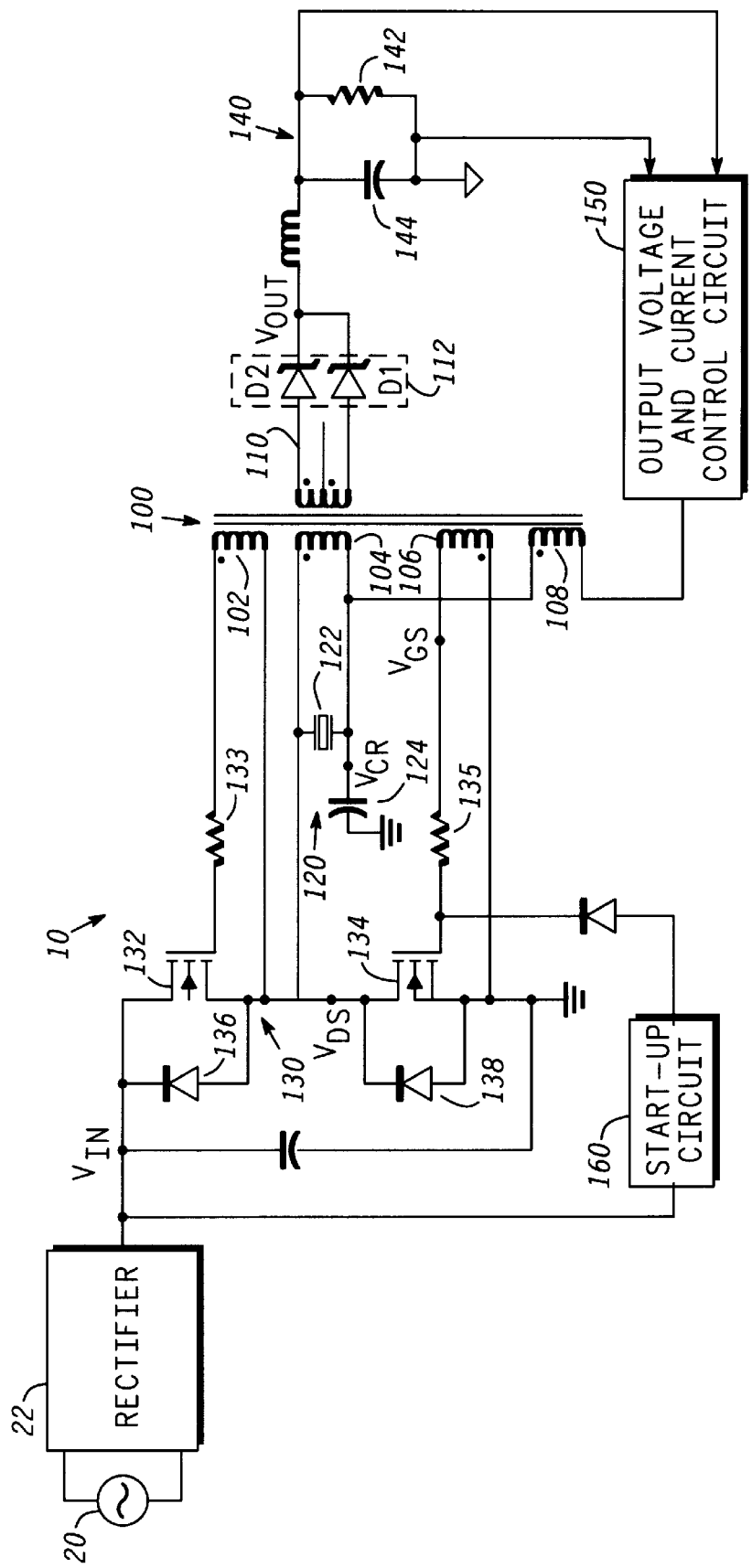
FIG. 2 is a detailed schematic diagram of the series-resonant converter according to the present invention.

Turning to FIG. 2, the series-resonant converter 10 is described in greater detail. The transformer 100 comprises a first primary winding 102, a second primary winding 104, a third primary winding 106, a fourth or auxiliary primary winding 108 and a secondary winding 110. The dots indicated on the windings 102–110 are important to achieve the desired oscillations. As is well known in the art, the dots indicate the inductive coupling between windings, and the corresponding direction of current flow.

The resonant tank circuit 120 is coupled to the second primary winding 104. Specifically, the piezo-electric crystal 122 is connected in parallel with the second primary winding 104. The resonant capacitor 124 is connected in series between the piezo-electric crystal 122 and ground. The piezo-electric crystal 122 may comprise a piezo-electric or ferroelectric material having a high coupling coefficient and appropriate mechanical properties. Examples are lithium-niobate ($LiNbO_3$), lead-zirconium titanate (PZT) or lithium tantalate ($LiTaO_3$). The construction of a suitable piezo-electric crystal for use as a resonant element is described hereinafter in conjunction with FIG. 12.

The power processor circuit 130 comprises a half-bridge switching arrangement consisting of first and second metal oxide silicon field effect transistors (MOSFET) switches 132 and 134. Further, the first and second switches 132 and 134 each includes a diode 136 and 138, respectively, connected between the source and drain as shown in FIG. 2. The first switch 132 is coupled to the input voltage $V_{IN}$ and its gate terminal is coupled by a resistor 133 to the first primary winding 102 of the transformer 100. The gate terminal of the second switch 134 is coupled by a resistor 135 to the third primary winding 106 of the transformer 100.

In a preferred embodiment for relatively high power converter applications, the most suitable switch using state-of-the-art technology is a MOSFET switch. MOSFET technology is best suited for a high switching frequency (greater than 1 MHz). However, other transistor technologies, such as bipolar junction and insulated-gate bipolar are suitable for lower switching frequencies (approximately 200 kHz) and could be used in a form of the power converter for some applications.

It is important that the polarity of the dots on the transformer 100 are as indicated in FIG. 2 so that the first and second switches 132 and 134 are driven by voltages on the first and third primary windings 102 and 106 at proper instants of time to sustain the relaxation-mode oscillations. This will be described in more detail in connection with FIG. 10.

The input voltage $V_{IN}$ is derived from an AC source 20 through a DC rectifier 22. The DC rectifier 22 is capacitively coupled to the source of the first switch 132, as shown in the diagram. The output voltage $V_{OUT}$ is generated across the secondary winding 110 of the transformer 100. An output rectifier 112 comprising diodes D1 and D2 rectifies the AC voltage at the secondary winding 110 and this DC output voltage is inductively coupled to a load 140 that is schematically represented as a resistor 142 and a capacitor 144.

The series-resonant converter 10 can drive a load 140 that may be substantially constant or may vary. In the case where the series-resonant converter 10 is used for variable load conditions, an output voltage and current control circuit 150 is provided which provides a feedback path from the load 140 to the auxiliary primary winding 108 of the transformer. The control circuit 150 is the subject of the aforementioned co-pending application, filed on even date.

A start-up circuit 160 is coupled to the input voltage $V_{IN}$ and to a gate of the second switch 134 in order to initiate oscillations of the resonant tank circuit 120. This will be described in more detail hereinafter.

Figure 3:
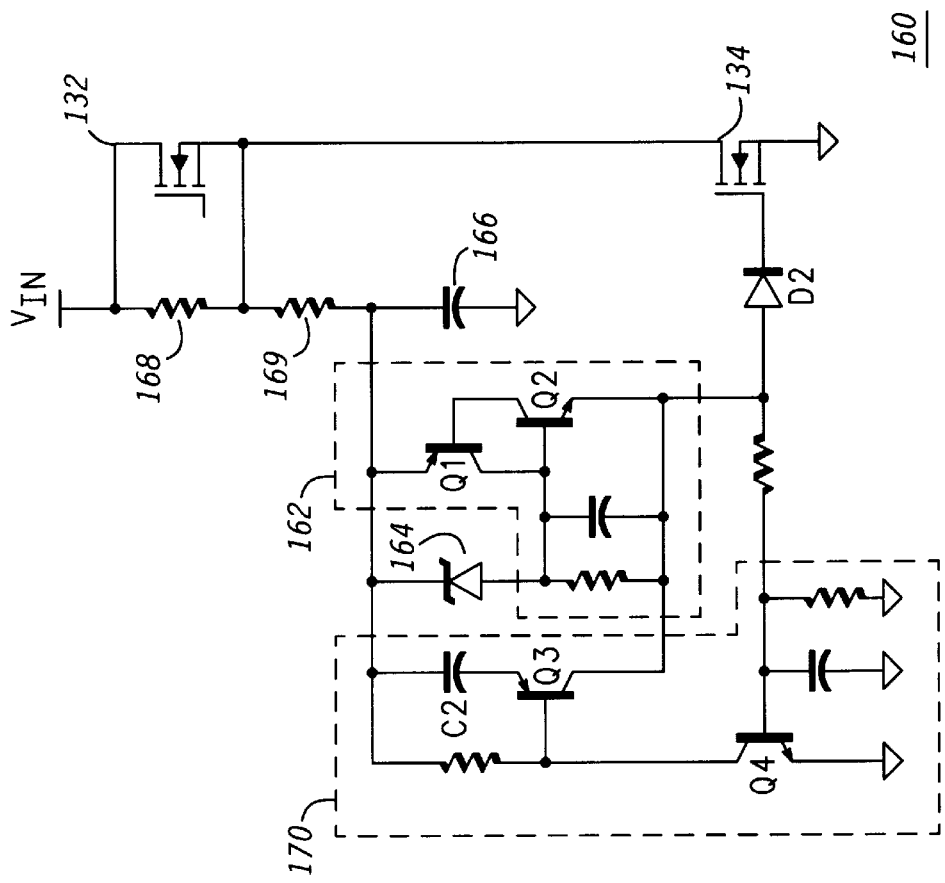
FIG. 3 is a detailed schematic diagram of a start-up circuit suitable for use in the series-resonant converter of the present invention.

FIG. 3 shows a start-up circuit 160 that is suitable for initiating oscillations of the resonant tank circuit 120. The start-up circuit 160 comprises a discrete silicon rectifier (SCR) latch consisting of transistors Q1 and Q2, a zener diode 164, a capacitor 166, resistors 168 and 169 coupled to the input voltage $V_{IN}$ and a reset circuit 170 consisting of transistors Q3 and Q4 and capacitor C2. The SCR latch 162 is gated by activation of the zener diode 164. When the SCR latch 162 is activated, the capacitor 166 is charged by the input voltage via the series combination of 168 and 169. At start-up, the capacitor 166 is charged towards the zener cut-in voltage, which turns the SCR latch "on", which in turn causes the capacitor 166 to discharge through the SCR latch 162 and into the gate of the second MOSFET switch 134 through the diode D2. This resulting pulse causes self-oscillation of the resonant tank circuit by charging the resonant capacitor 124, as explained hereinafter.

The start-up circuit shown in FIG. 3 is by way of example only. There are many others circuits and configurations that are suitable for pulsing the switch 134 to turn the switch 134 "on" and begin oscillations of the resonant tank circuit. For example, a microprocessor may output a 5 volt pulse that can be employed to pulse the switch 134 and begin the oscillation process.

Figure 4:
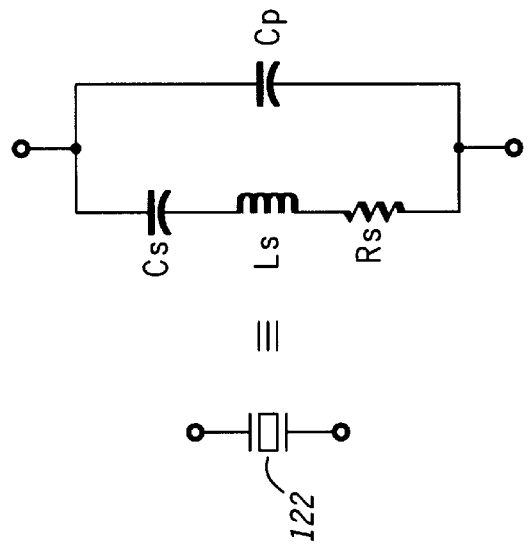
FIG. 4 is a schematic diagram of an equivalent circuit for the piezo-electric crystal used as a self-oscillating resonant element in the series-resonant converter of the present invention.

Turning to FIG. 4, the piezo-electric crystal 122 is described in greater detail. As is well known in the art, a piezo-electric crystal is a material that exhibits an external electric field when a mechanical stress is applied to it. Conversely, when a charge is applied to electrodes on the surface of the material, mechanical vibrations occur in the material at a frequency which his proportional to the charge applied. It is this storage of mechanical energy that is exploited according to the present invention. Specifically, whereas many prior art power converters comprise a bulky and lossy inductor as the resonant element that stores magnetic energy, the power converter of the present invention comprises a piezo-electric crystal that stores mechanical energy and exhibits much better loss and "Q" characteristics than an inductor. In addition, the piezo-electric crystal is much smaller in size than an inductor of comparable characteristics.

Figure 5:
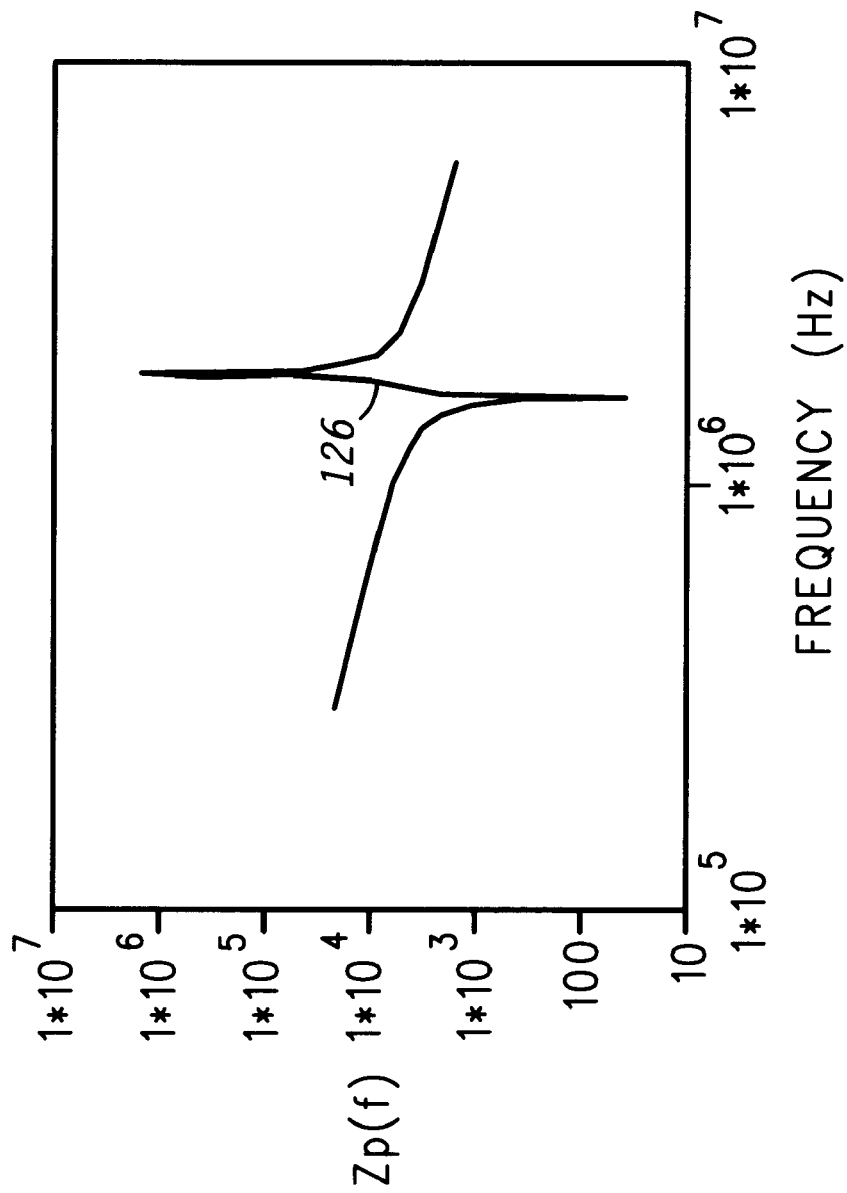
FIG. 5 is a graphical diagram showing the impedance characteristics of a piezo-electric crystal.

The piezo-electric crystal 122 can be represented as a series R-L-C circuit with an additional parallel capacitor. This is shown in FIG. 4 by the circuit consisting of elements Cs, Ls, Rs and Cp. Referring to FIG. 5, it is shown that the impedance characteristics of the piezo-electric crystal have series and parallel resonance. Between the series and parallel resonance portions shown at reference numeral 126 in FIG. 5, the piezo-electric crystal emulates a series R-L impedance. It is in this frequency range that the characteristics of the piezo-electric crystal are exploited to achieve a self-oscillating resonant tank circuit. Proper selection of the resonant capacitor 124 (FIG. 2) is necessary to achieve operation in this "inductive" mode of the frequency range. A suitable resonant capacitor is a 2200 pF capacitor.

The operation of power converter 10 will now be described with reference to FIG. 2. To initiate operation, a start-up circuit 160 is employed in order to begin oscillations of the resonant tank circuit 120. The power processor circuit 130 has a stable operating point when both MOSFET switches 132 and 134 are in the "off" state. To initiate oscillations this mode must be perturbed. The start-up circuit 160 initiates oscillations by providing short duration pulses (as described above) to the gate of the second MOSFET switch 134. The resistor 135 connected to the primary winding provides current to pre-charge the resonant capacitor 124. Once the second MOSFET switch 134 turns on, it discharges the capacitor 124 through the piezo-electric crystal 122, which begins resonant oscillation. The high "Q" nature of the piezo-electric crystal 122 guarantees sufficient conditions to ensure that as the second MOSFET switch 134 completes its conduction cycle, the first MOSFET switch 133 will be turned on, thereby sustaining oscillations.

The voltage across the second primary winding 104 is fed back to the gates of the first and second MOSFET switches 132 and 134 to maintain oscillations. Once the current through the piezo-electric crystal 122 has reached a maximum, voltage across the second primary winding 104 is reduced and acts as a source polarity switch. The resonant currents through the piezo-electric crystal 122 produce a rapid switch in the polarity of the first and third primary windings 102 and 106 and thus drive the first and second MOSFET switches 132 and 134 alternately on and off. The resonant tank circuit 120 switches operating states when the voltage on the first primary winding 102 or third primary winding 106 falls below the voltage threshold of the gate the first or second MOSFET switch 132 and 134, respectively.

The gate-source voltage threshold for the first and second MOSFET switches 132 and 143 is above zero (approximately between 1 and 5 volts). In addition, the first and second MOSFET switches 132 and 134 have a zero-voltage switching characteristic, meaning that their channels conduct with zero drain-source volts. As a result, the first and second MOSFET switches 132 and 134 will always be turned on before the resonant tank circuit 120 resonates through the zero voltage point. Furthermore, the switching frequency of the resonant tank circuit 120 is guaranteed to be at least the resonant frequency of the piezo-electric crystal 122.

Figure 10:
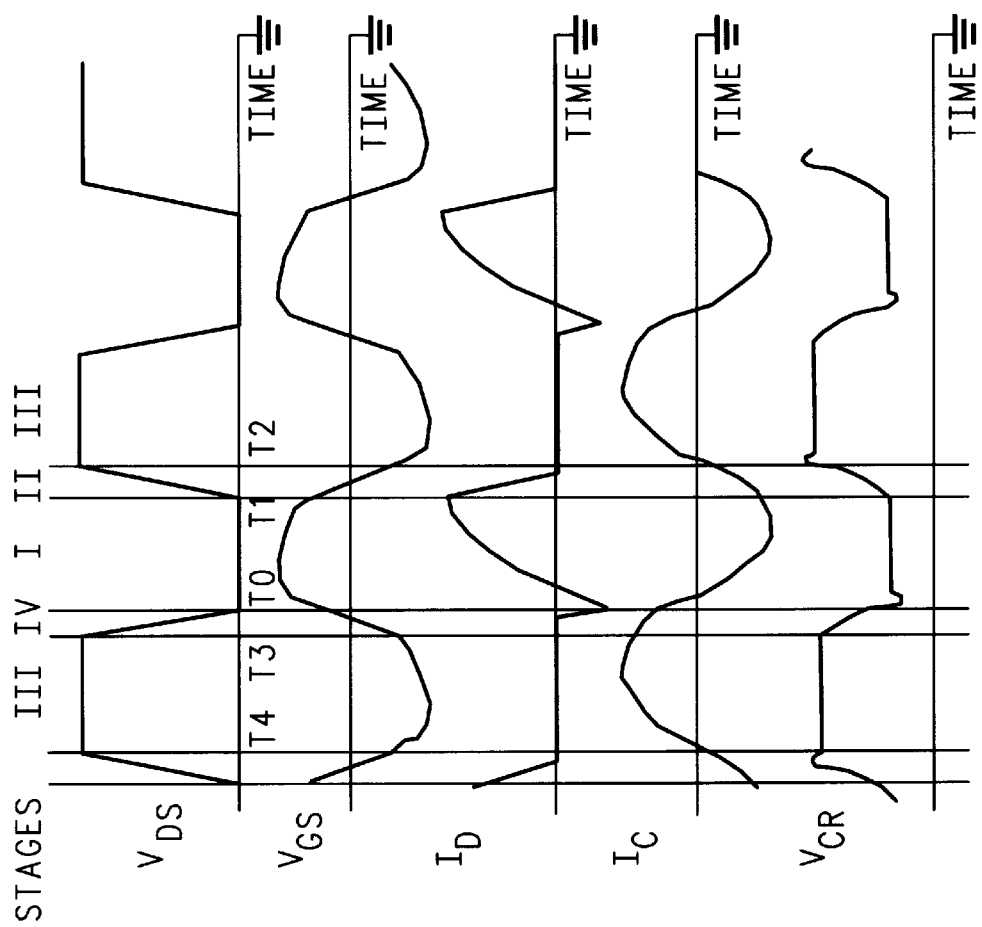
FIG. 10 illustrates several waveform diagrams of signals in the series-resonant converter according to the present invention.

The series-resonant converter 10 operates in four stages. FIGS. 6–9 show the simplified schematic diagrams for the series-resonant converter 10 during each of these stages. FIG. 10 shows the waveforms for several points in the power converter 10 through these stages, as indicated. Waveform $V_{DS}$ is the drain-source voltage across the second MOSFET switch 134. Waveform $V_{GS}$ is the voltage across the third primary winding 106, which corresponds to the gate to source voltage of the second MOSFET switch 134. Waveform $I_D$ is the current in the second MOSFET switch 134. Waveform $I_C$ is the current through the piezo-electric crystal 122. Waveform $V_{CR}$ is the voltage across the resonant capacitor 124.

Stage I

Resonant Capacitor Discharging

With reference to FIG. 6, stage I will be described. The first stage begins at time $T_0$ with the assumption that the voltage across the capacitor 124 is at its maximum level. The second MOSFET switch 134 will begin to conduct due either to transformer coupled gate activation by voltage VGS or the auxiliary start-up circuit 160. As the voltage across the resonant capacitor 124 diminishes, the current through the piezo-electric crystal 122 also decreases and energy is delivered to the load 140 through diode D1 of the rectifier 112. The voltage across the second primary winding 104 increases in a resonant manner and thus the third primary winding 106 coupled to the gate of the second MOSFET switch 134 will also reflect this changing voltage. The second MOSFET switch 134 turns off once the voltage at its gate falls below the gate threshold voltage (approximately –5 volts).

Stage II

Reactive Energy Recirculation to Source

Turning to FIG. 7, the second stage begins as the second MOSFET switch 134 reaches cut-off and the voltage on the resonant capacitor 124 falls to its minimum voltage level. At this point, the energy stored in the resonant tank circuit 120 will return to the source via the diode 136 of the first MOSFET switch 132. This stage continues until all of the energy stored in resonant tank circuit 120 has been removed.

The characteristic impedance (Zn) of the resonant tank circuit 120 includes the capacitance of the resonant capacitor 124 and the effective inductance of the piezo-electric crystal 122, which remains constant under all load conditions. This produces near load-invariant behavior of the resonant tank and operating frequency.

Stage III

Resonant Capacitor Charge

As shown in FIG. 8, the third stage begins as the first MOSFET switch 132 begins to conduct and the resonant capacitor 124 begins to charge towards the input voltage. Conduction of the first MOSFET switch 134 allows the resonant capacitor 124 to charge towards its peak voltage through the piezo-electric crystal 122. The increasing voltage across the resonant capacitor 124 induces an increasing current in the piezo-electric crystal 122 and therefore decreases the voltage in the second primary winding 104. Diode D1 of the rectifier 112 conducts the entire load current during this stage. This stage ends once the voltage in the second primary winding 104 decreases to a point where the voltage in the first primary winding 102 brings the first MOSFET switch 132 into cutoff, and the voltage on the resonant capacitor 124 reaches its maximum level.

Stage IV

Reactive Energy Recirculation to Ground

FIG. 9 illustrates the topology during the final stage. The mechanism of this stage is identical to STAGE II. It begins as the first MOSFET switch 132 reaches cutoff and the voltage on the resonant capacitor 122 rises to its peak voltage level. All the energy stored in the resonant tank circuit 120 will return to the ground via the diode 138 of the second MOSFET switch 134.

Figure 11:
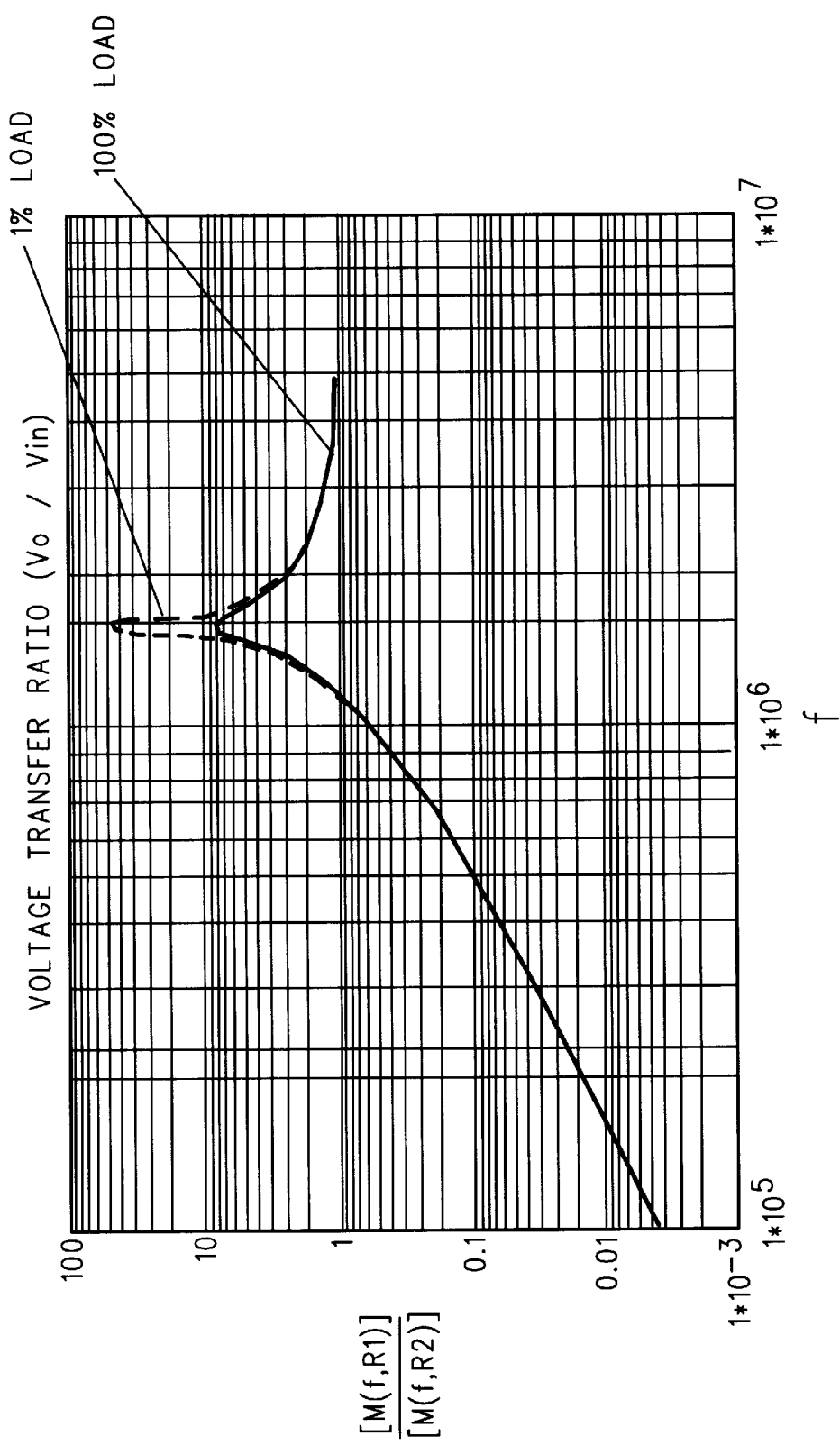
FIG. 11 is a graphical diagram showing the voltage transfer ratio of the series-resonant converter according to the present invention.

FIG. 11 is a graph showing the voltage transfer ratio $V_{OUT}/V_{IN}$ for the power converter. What is significant in the graph is that the resonant frequency under 100% load conditions is only slightly different than the resonant frequency under 1% load conditions.

When the series-resonant converter 10 is used under variable load conditions, such as for powering a laptop computer whose power requirements vary depending on what activities are performed by the computer, the output voltage and current control circuit 150 is necessary to stabilize the output voltage or current. Circuits suitable for this function are described in the co-pending application referred to above, filed on even date.

Figure 12:
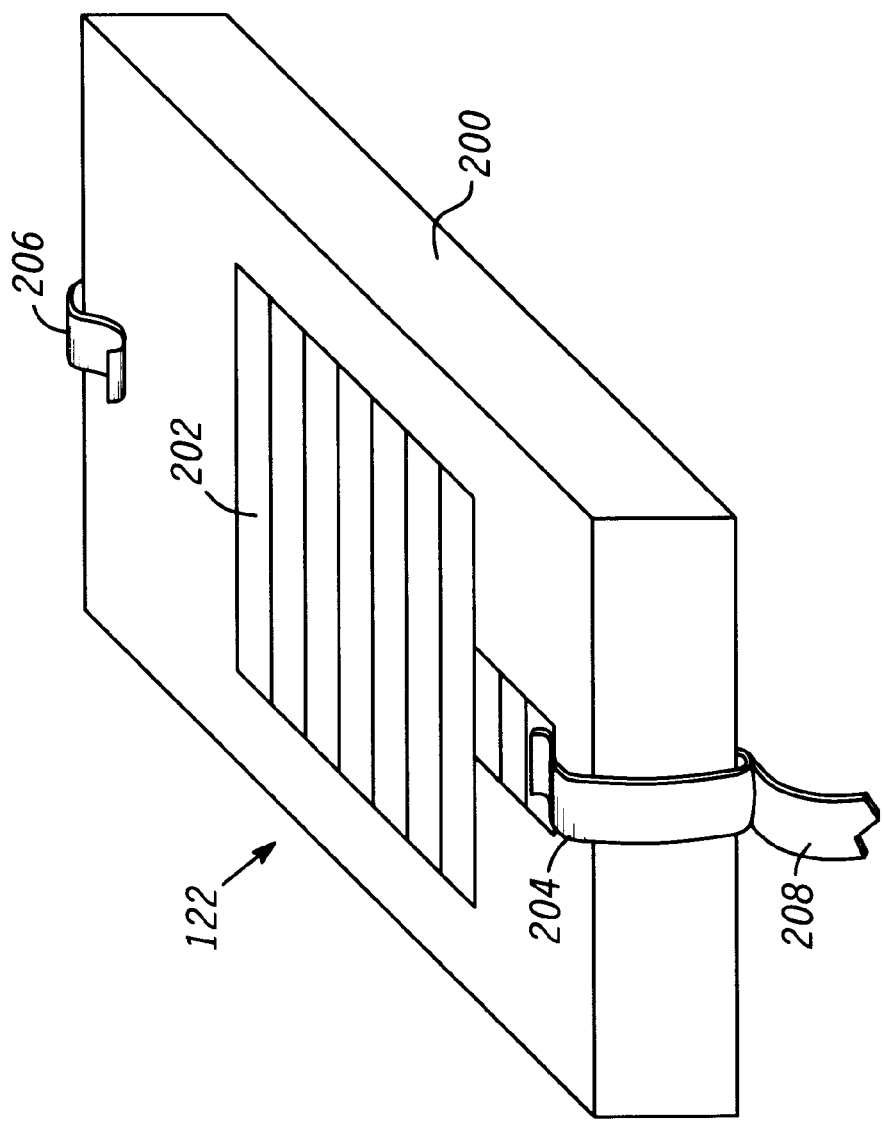
FIG. 12 illustrates an example of a physical structure for a piezo-electric crystal resonant element used in the series-resonant converter according to the present invention.

FIG. 12 shows a physical structure for a piezo-electric crystal resonant element. The piezo-electric crystal resonant element 122 includes a crystal 200 having metallized electrode regions 202 on its top and bottom surfaces. For simplicity, only one metallized electrode region, located on the top surface of crystal 200 is shown. Mounting structures 304 and 206 provide electrical contact between a lead 208 and its corresponding electrode. It should be appreciated that the geometries of the crystal 200, the electrodes 202 and the mounting structures 204 and 206 are not limited to those shown in FIG. 12. They can be modified in various ways to provide desired electrical and mechanical performance properties for the piezo-electric crystal resonant element 122. For example, the crystal 200 may be disk-shaped with contoured surfaces, as opposed to flat surfaces. Various other aspects relating to the fabrication and composition of the piezo-electric crystal resonant element 122 are widely known by those with ordinary skill in the art of resonators and related devices.

The piezo-electric crystal resonant element 122 stores electrical energy in the form of mechanical vibrations in the crystal 200, whereas a conventional magnetic inductor that stores electrical energy in a magnetic field. The mechanical vibrations impose a degree of stress upon the crystal 200 that, for a given size and type of material, determine the amount of energy that can be efficiently stored and transferred. Accordingly, in order to achieve a high degree of energy storage/transfer for a given volume of crystal material 200, it may be preferable that the piezo-electric crystal element 122 be operated in a "thickness-shear" mode. In this mode, vibrations in the crystal occur so that the resultant shear forces in the crystal 200 are directed along an axis parallel to the planes of the metallized electrode regions 202.

The present invention is directed to a series-resonant converter based around a piezo-electric crystal as the resonant element. It is a further important feature of the invention that self-oscillation is exploited for deriving the voltage that drives each of two switches. The piezo-electric crystal is a compact replacement for a bulky inductor and has a much higher Q factor. The reactive component of the piezo-electric crystal acts a small "inductor" and replaces a large ferrite inductor normally used in a resonant tank circuit of power converters. Typically in prior art circuits the resonant inductor is a larger component than the transformer or is emulated by the transformer itself, thereby requiring a larger magnetic core. In the present invention, the piezo-electric crystal obviates the need for the large bulky inductor and alleviates any other complexities in transformer design. In addition, the self-oscillation feature overcomes circuit complexities that would be required to deal with the variations in the tuned crystal frequency. Conventional power converters are not normally self-oscillating and to use a piezo-electric crystal in a conventional power converter requires a sophisticated synchronizing circuit to control the switching frequency. No synchronizing circuit is needed in the power converter of the present invention.

Thus, to summarize the advantages of the present invention are:

1. A piezo-electric crystal is more compact and loss-less whereas a conventional magnetic ferrite element increases the size and weight of the converter and is lossy.
2. Using the piezo-electric crystal as a self-oscillator, synchronization is automatically achieved and there is no need for additional gate drive circuits.

Another benefit of the power converter according to the present invention is its ability to achieve relatively constant frequency over the entire load range and loss-less switching which is essential to converter operation in the megahertz range. Due to the high switching frequency and the compact nature of the crystal the converter is expected to have very high power density.

In summary, the present invention is directed to a series-resonant converter comprising: a transformer having a first primary winding, a second primary winding, a third primary winding and a secondary winding, the first primary winding and the third primary winding carrying current flow in opposite directions from each other; first and second switches, the first switch being connected to the first primary winding of the transformer and to an input voltage, the second switch being connected to the third primary winding of the transformer, the first and second switches being driven by voltages at the first and third primary windings, respectively, so as to alternately turn on and off; a resonant tank circuit coupled to the first and second switches and to the second primary winding, the resonant tank circuit comprising a piezo-electric crystal connected in parallel with the second primary winding of the transformer and a resonant capacitor connected in series with the piezo-electric crystal and ground; and wherein the piezo-electric crystal self-oscillates to store and release energy and thereby charge and discharge the resonant capacitor, and to synchronously change a magnitude and switch a polarity of voltage induced on the second primary winding to induce corresponding voltages on the first and third primary windings to alternately drive the first and second switches in order to maintain oscillation of the resonant tank circuit.

In addition, the present invention is directed to, in a series-resonant converter comprising a resonant tank circuit connected in parallel with a second primary winding of a transformer, the resonant tank circuit comprising a piezo-electric crystal and a resonant capacitor connected in series with piezo-electric crystal and ground, a method for achieving self-oscillation of the resonant tank circuit comprising steps of: coupling a first switch between a voltage source and a first primary winding of the transformer; coupling a second switch between the voltage source and a third primary winding of the transformer, which third primary winding carries current flow in a direction opposite that through the first primary winding; and initiating oscillation of the resonant tank circuit so that the resonant tank circuit oscillates and in so doing alternately opens and closes the first and second switches synchronous with the charging and discharging cycle of the resonant capacitor so as to maintain self-oscillation of the resonant tank circuit.

The above description is intended by way of example only and is not intended to limit the present invention in any way except as set forth in the following claims.

What is claimed is:

1. A series-resonant converter comprising:
    a transformer having a first primary winding, a second primary winding, a third primary winding and a secondary winding, the first primary winding and the third primary winding carrying current flow in opposite directions from each other;
    first and second switches, the first switch being coupled to the first primary winding of the transformer and to an input voltage, the second switch being coupled to the third primary winding of the transformer, the first and second switches being driven by voltages at the first and third primary windings, respectively, so as to alternately turn on and off;
    a resonant tank circuit coupled to the first and second switches and to the second primary winding, the resonant tank circuit comprising a piezo-electric crystal connected in parallel with the second primary winding of the transformer and a resonant capacitor connected in series with the piezo-electric crystal and ground; and
    wherein the piezo-electric crystal self-oscillates to store and release energy and thereby charge and discharge the resonant capacitor, and to synchronously change a magnitude and switch a polarity of voltage induced on the second primary winding to induce corresponding voltages on the first and third primary windings to alternately drive the first and second switches in order to maintain oscillation of the resonant tank circuit.

2. The series-resonant converter of claim 1, wherein the first and second switches are MOSFET switches each having a gate terminal, the gate terminal of the first MOSFET switch being coupled to the first primary winding and responsive to voltage thereon to turn on or off, and the gate terminal of the second MOSFET switch being coupled to the third primary winding and responsive to voltage thereon to turn on or off.

3. The series-resonant converter of claim 2, wherein the first and second MOSFET switches have a zero-voltage switching characteristic.

4. The series-resonant converter of claim 1, wherein the piezo-electric crystal element comprises a crystal element selected from the group consisting of lithium-niobate, lead-zirconium titanate, and lithium tantalate.

5. The series-resonant converter of claim 1, and further comprising a start-up circuit coupled to the second switch that delivers pulses to the second switch to turn on the second switch and begin oscillation of the resonant tank circuit.

6. The series-resonant converter of claim 1, and further comprising a rectifier circuit coupled to the secondary winding of the transformer to rectify voltage across the secondary winding and thereby generate a DC output voltage.

7. A series-resonant converter comprising:
    a transformer having a first primary winding, a second primary winding, a third primary winding and a secondary winding, the first primary winding and the third primary winding carrying current flow in opposite directions from each other;
    a half-bridge switching circuit comprising first and second MOSFETs, a gate of the first transistor being connected to the first primary winding of the transformer and a drain of the first MOSFET being connected to a supply of input voltage, a gate of the second MOSFET being connected to the third primary winding of the transformer, the first and second MOSFETs being driven by voltages at the first and third primary windings, respectively, so as to alternately turn on and off;
    a resonant tank circuit coupled to the first and second switches and to the second primary winding, the resonant tank circuit comprising a piezo-electric crystal connected in parallel with the second primary winding of the transformer and a resonant capacitor connected in series with the piezo-electric crystal and ground; and wherein the piezo-electric crystal self-oscillates to store and release energy and thereby charge and discharge the capacitor, and to synchronously change a magnitude and switch a polarity of voltage induced on the second primary winding to induce corresponding voltages on the first and third primary windings to alternately drive the first and second MOSFETs in order to maintain oscillation of the resonant tank circuit.

8. The series-resonant converter of claim 7, wherein the first and second MOSFETs have a zero-voltage switching characteristic.

9. The series-resonant converter of claim 7, wherein the piezo-electric crystal element comprises a crystal element selected from the group consisting of lithium-niobate, lead-zirconium titanate, and lithium tantalate.

10. In a series-resonant converter comprising a resonant tank circuit connected in parallel with a second primary winding of a transformer, the resonant tank circuit comprising a piezo-electric crystal and a resonant capacitor connected in series with piezo-electric crystal and ground, a method for achieving self-oscillation of the resonant tank circuit comprising steps of:

coupling a first switch between a voltage source and a first primary winding of the transformer;

coupling a second switch between the voltage source and a third primary winding of the transformer, which third primary winding carries current flow in a direction opposite that through the first primary winding; and initiating oscillation of the resonant tank circuit so that the resonant tank circuit oscillates and in so doing alternately opens and closes the first and second switches synchronous with the charging and discharging cycle of the resonant capacitor so as to maintain self-oscillation of the resonant tank circuit.

11. The method of claim 10, wherein the step of initiating oscillation comprises applying voltage pulses through the second switch to the third primary winding thereby inducing voltage in the second primary winding to begin charging the resonant capacitor in the resonant tank circuit.

\* \* \* \* \*